United States Patent [19]

Tsuchino et al.

[11] Patent Number: 4,507,379

[45] Date of Patent: Mar. 26, 1985

[54] METHOD FOR CONVERTING RADIOGRAPHIC IMAGES

[75] Inventors: Hisanori Tsuchino; Manami Teshima; Hiroshi Takeuchi; Fumio Shimada, all of Hino, Japan

[73] Assignee: Konishiroku Photo Industry Co., Ltd., Tokyo, Japan

[21] Appl. No.: 525,318

[22] Filed: Aug. 22, 1983

[30] Foreign Application Priority Data

Aug. 25, 1982 [JP] Japan .............................. 57-148285

[51] Int. Cl.$^3$ ................................................ G03C 5/04
[52] U.S. Cl. ................................. 430/139; 250/327.2; 250/337; 250/484.1; 252/301.4 P
[58] Field of Search ..................... 430/139; 250/327.2, 250/337, 484.1; 252/301.4 P

[56] References Cited

U.S. PATENT DOCUMENTS

| | | | |
|---|---|---|---|
| 3,509,065 | 4/1970 | Palilla | 252/301.4 P |
| 3,513,103 | 5/1970 | Shaffer | 252/301.4 P |
| 3,859,527 | 1/1975 | Luckey | 250/337 |
| 4,400,619 | 8/1983 | Kotera et al. | 250/327.2 |

FOREIGN PATENT DOCUMENTS 1462769 1/1977 United Kingdom .

*Primary Examiner*—Won H. Louie
*Attorney, Agent, or Firm*—Jordan B. Bierman

[57] ABSTRACT

In a radiographic image conversion method in which a stimulating light is irradiated to a panel storing a radiation energy in the form of an image to reproduce and then to read out the image, the response speed of a stimulation and the reading speed of a radiographic image area increased by making use of (1) a phosphate type phosphor having the composition, $xM_3(PO_4)_2 \cdot NX_2$:yA or $M_3(PO_4)_2$:yA, which is a highly sensitive phosphor capable of readily releasing the stored energy when a stimulating light is irradiated to the phosphor, and (2) the stimulating light having the range of the wavelengths from a visible ray of not shorter that 500 nm to an infrared ray.

15 Claims, 6 Drawing Figures

METHOD FOR CONVERTING RADIOGRAPHIC IMAGES

BACKGROUND OF THE INVENTION

1. Field of the invention

The present invention relates to a method for converting radiographic images, and more particularly to a method for the converting radiographic images which utilizes a stimulable phosphor.

2. Description of the state of the art

In order to obtain radiographic images, there has until now been used silver halide-utilizing photographic system, the so-called radiographic photography, but in recent years there has arisen a demand for the development of method for the formation of radiographic images without use of a silver halide because of the global shortage of silver resources.

As a method substitutable for the above-mentioned radiographic photography, there has now been contemplated such a method that the radiation that has passed through an object is absorbed into a phosphor, and after that, the phosphor is excited by a certain energy to thereby radiate the radiation energy stored in the phosphor as fluorescence, and the fluorescence is then detected to thereby form an image. To be concrete, there is proposed a method for the converting radiographic images wherein as the phosphor, a thermoluminescent phosphor is used, and as the excitation energy, thermal energy is used (British Pat. No. 1,462,769 and Japanese Pat. Publication Open to Public Inspection (hereinafter referred to as Japanese Pat. O.P.I. Publication) No. 29889/1976). This conversion method is such that a panel comprising a support formed thereon with a thermoluminescent phosphor layer is used, and into the thermoluminescent phosphor layer of the panel is absorbed a radiation that has passed through an object to thereby store therein a radiation energy pattern corresponding to the pattern of the radiation, and after that the thermoluminescent phosphor layer is heated to take out the stored radiation energy in the form of a light signal pattern, the light pattern forming an image. However, it is indispensable for this method that the panel is so heat-resistant as not to be deformed nor to be changed in quality by heat because it must be heated at the time of changing the stored radiation energy into a light signal, and therefore large restrictions are put on the materials used for the thermoluminescent phosphor layer and the support which are the components of the panel. Thus, there exists a large drawback in the practical use of the method which uses a thermoluminescent phosphor as the phosphor and thermal energy as the excitation energy. On the other hand, there are also known other methods which use at least one of visible rays and infrared rays as the excitation energy as described in U.S. Pat. No. 3,859,527, and Japanese Pat. O.P.I. Publication Nos. 12142/1980, 12143/1980, 12144/1980, 12145/1980, 84389/1980, 160078/1980, and the like.

These methods need not be heated at the time of changing the stored radiation energy into a light signal unlike the previously mentioned method, and therefore the panel need not be heat-resistant, so that the methods may be deemed favorable for the conversion of radiographic images.

However, among those phosphors used in the methods disclosed in the above-mentioned publications, for example, cerium- and samarium-activated strontium sulfide phosphor (SrS:Ce,Sm) europium- and samarium-activated strontium sulfide phosphor (SrS:Eu,Sm), europium- and samarium-activated lanthanum oxysulfide phosphor (La$_2$O$_2$S:Eu,Sm), manganese- and halogen-activated zinccadmium sulfide phosphor [(Zn,Cd)S:Mn,X wherein X is a halogen], europium-activated barium aluminate phosphor, alkaline earth metal silicate phosphor, rare earth element-activated lanthanum oxyhalide phosphor, and the like, are extremely low sensitive, so that from the practical application point of view, the improvement on the sensitivity in the formation of radiographic images had been sought. Further, among those phosphors used in the above methods, copper- and lead-activated zinc sulfide phosphor (ZnS:Cu,Pb), europium-activated alkaline earth fluorohalide phosphor, rare earth element-activated alkaline earth metal fluorohalide-type phosphor, rare earth element-activated divalent metal fluorohalide phosphor, and the like, have extremely low response speed to the excitation light that is used for releasing the stored radiation energy as fluorescence (hereinafter referred to as "stimulating ray or light", and therefore they have the disadvantage that the speed thereof to read out the image recorded in the phosphor becomes extremely reduced.

SUMMARY OF THE INVENTION

An object of the present invention is to provide a method for converting radiographic images which has an extremely high sensitivity and which is practically usable, and another object of the invention is to provide a method for converting radiographic images which has a high response speed to a stimulating light and a high speed of reading out a radiographic image.

As a result of our various investigations it has been found that the above objects can be accomplished by a method for converting radiographic images comprising steps of (1) making a radiation passed through an object absorbed into a stimulable phosphor, (2) stimulating the phosphor by a stimulating ray to release a radiation energy stored in the phospher as fluorescence, and (3) detecting the fluorescence to form an image, wherein the phosphor is a phosphate-type phosphor of Formula (I) or (II) and the stimulating ray is at least one of a visible ray of not less than 500 nm and a infrared ray.

Formula (I)

$$xM_3(PO_4)_2 \cdot NX_2 \cdot yA$$

Formula (II)

$$M_3(PO_4)_2 \cdot yA$$

wherein M and N selected from at least one of Mg, Ca, Sr, Ba, Zn and Cd; X is at least one of F, Cl, Br and I; A is at least one of Eu, Tb, Ce, Tm, Dy, Pr, Ho, Nd, Yb, Er, Sb, Tl, Mn and Sn; and x and y are values satisfying the conditions of $0 < x \leq 6$ and $0 \leq y \leq 1$, respectively.

The method for converting radiographic images in the present invention comprises the absorption of a radiation passed through an object into at least one of those phosphate-type phosphors having the above-described formula; the stimulation of the phosphor by at least one of visible rays having long wavelengths not less than 500 nm and infrared rays to thereby release as fluorescence the radiation energy that has been stored in the phosphor; and the detection of the fluorescence.

BRIEF DESCRIPTION OF THE DRAWINGS

FIG. 2(a) shows a phosphoric layer which is provided to a substrate, and FIG. 2(b) shows the phosphoric layer which is provided between two substrates.

DETAILED DESCRIPTION OF THE INVENTION

Figure 1:
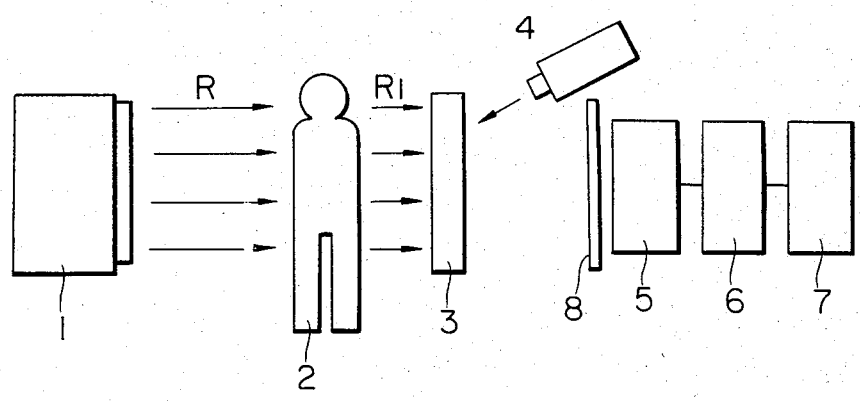
FIG. 1 is a block diagram of the method of the present invention, illustrating that an radiographic image is recorded onto a phosphor and the recorded image is stimulated by an stimulating ray to read the image.

The method for converting radiographic images of the present invention is illustrated in detail below by use of the schematic illustration shown in FIG. 1. In FIG. 1, numbered 11 is a radiation source, 12 is an object, 13 is a radiographic image conversion panel having a visible ray- or infrared ray-stimulable phosphor layer containing a phosphor having Formula (I) or (II), 14 is a stimulation light source for radiating as fluorescence the radiographic image on the radiographic image conversion panel, 15 is a photoelectric converter for the detection of the fluorescence radiated from the radiographic image conversion panel, 16 is a reproduction device reproducing as an image the photoelectrically converted signal detected by photoelectric converter 15, 17 is a display unit displaying the reproduced image, and 18 is a filter for cutting the reflected light from light source 14 and for transmitting only the light radiated from radiographic image conversion panel 13. 15 and these numbered thereafter are allowed to be any if capable of reproducing the light information from 13 into an image in some form, and not necessarily limited to the above. As shown in FIG. 1, object 12 is put in between radiation source 11 and radiographic image conversion panel 13, and when a radiation R irradiates, the radiation R passes through the object according to the radiation transmittance of each part of the object, and the transmitted image RI (i.e., the image formed according to the intensity pattern of the radiation) is then made incident upon radiographic image conversion panel 13. This incident transmission image RI is absorbed into the phosphor layer of panel 13, whereby electrons or positive holes proportional to the radiation dose absorbed in the phosphor layer are produced to be stored in the trap levels of the phosphor, that is, such a stored image as a latent image of the radiation-transmitted image is formed. The stored image is then stimulated by a light energy to become actualized. Namely, electromagnetic wave which is at least one of visible rays having wavelengths of not less than 500 nm and infrared rays from light source 14 irradiates the phosphor layer to expel the electrons or positive holes stored in the trap thereof to radiate the stored image in the form of fluorescence. The intensity pattern of this radiated fluorescence is proportional to the intensity pattern of the radiation energy absorbed into the phosphor layer of panel 13, and the light signal is converted into an electric signal by means of photoelectric converter 15 such as, for example, a photoelectric multiplier, etc., and reproduced into an image by image reproduction device 16, and the image is then displayed on image display unit 17.

Figure 2A:
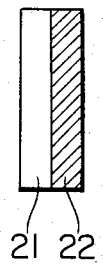
FIG. 2(a) and 2(b) are sectional views respectively showing a radiographic image conversion panel, and inter alia.

The radiographic image conversion panel and the stimulation light source to radiate the stored image as fluorescence used in the method of the present invention are illustrated in detail below:

The structure of the radiographic image conversion panel, as shown in FIG. 2(a), is composed of a support 21 and a phosphor layer 22 formed on one side of support 21. This phosphor layer 22 comprises at least one of phosphors included in those phosphate-type phosphors having the foregoing formula. The phosphor used herein, when stimulated by electromagnetic wave which is at least one of visible rays having wavelengths of not less than 500 nm and infrared rays after being subjected to the irradiation of radiation, emits a strong stimulated light, which can be used in the method of the present invention, and particularly when the activator content of the phosphor is 0 to 1 gram atom, preferably from $10^{-6}$ to 0.6 gram atom to the unit quantity of the host lattice of the phosphor, the stimulated light intensity becomes extremely strong, and by rendering these the phosphor layer of the radiographic image conversion panel, a particularly highly efficient radiographic image conversion can be carried out.

The following is an example of the method for preparing a radiographic image conversion panel.

First, eight parts by weight of a phosphor and one part by weight of nitrocellulose are mixed with a mixture of solvents (a mixture of acetone, ethyl acetate and butyl acetate) to prepare a coating liguid having a viscosity of about 50 centistokes. This coating liguid is then coated uniformly over a polyethylene terephthalate film (substrate) which is held horizontal, and, as it is, allowed to stand over a whole day and night for drying, thereby forming a phosphor layer with a thickness of about 300 μm to produce a radiographic image conversion panel. In this case, as the substrate, for example, a transparent glass or a metallic thin plate such as of aluminum may also be used.

Figure 2B:
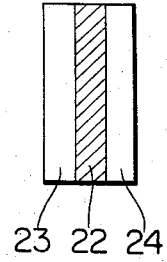

In addition, the panel may be of such a structure that, as shown in FIG. 2(b), the phosphor is sandwiched in between substrates 23 and 24 such as two glass plates to make an arbitrary thickness-having phosphor layer 22 whose periphery is sealed.

In the method of the present invention, as the stimulating light source, besides the light source emitting a light having a band spectral distribution in at least one of infrared region and visible rays' region of from not less than 500 nm to preferably not more than 1100 nm, there may be used a light source emitting a single wavelength light such as He-Ne laser light (633 nm), YAG laser light (1064 nm), ruby laser light (694 nm), argon laser light, semiconductor laser light, and the like. Particularly when using a laser light, a high stimulation energy can be obtained.

Figure 3:
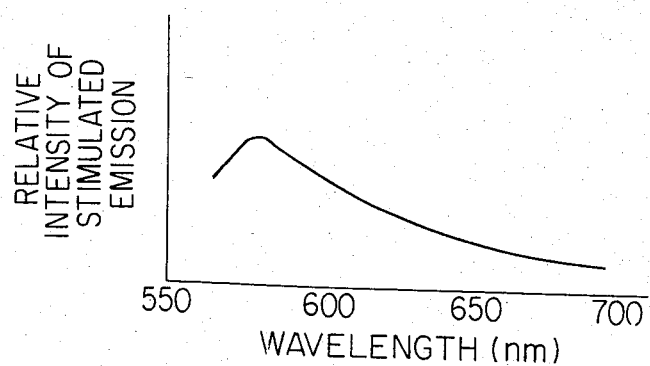
FIG. 3 is a graph showing the relation of stimulated emission to stimulating light's wavelength of the radiographic image conversion panel relating to the invention.

FIG. 3 is a drawing showing the relation of stimulated emission to stimulating light's wavelength of the radiographic image conversion panel in the present invention; that is, it plots the respective intensity of the fluorescence radiated when the $3Sr_3(PO_4)_2 \cdot CaCl_2$:Eu phosphor using-panel is subjected to various light different in the wavelength after irradiated by X-rays having an equivoltage of 80 KVp.

As apparent from FIG. 3, in the case of the $3Sr_3(PO_4)_2 \cdot CaCl_2$:Eu phosphor, the excitable wavelength range of stimulating light is from 500 to 1100 nm, and particularly the range of from 500 to 900 nm is the optimum wavelength range. Therefore, as may be understood from the above, the excitable wavelength range of stimulating light of the phosphate-type phosphor usable in the present invention, although differing to some extent according to the composition of the phosphor used, may be within the range of approximately from 500 to 1100 nm, and the optimum wavelength range is from 500 to 900 nm.

In the method of the present invention, as the stimulating light source for use in releasing as fluorescence the radiation energy that is stored in the phosphor layer, at least one of visible rays having wavelengths of not less than 500 nm and infrared rays can be used. However, the traps stimulated by infrared rays have small energy gaps and therefore the periods for trapping electrons or positive holes are short, so that it is not considered favorable for practical use to read out the information of such traps. For example, in obtaining an image, there is often carried out such a procedure that the phosphor layer of the irradiated radiographic image conversion panel is stimulated by scanning with infrared rays to radiate a light and the light is then electrically treated, but the overall scanning of the entire area of the phosphor layer requires a certain period of time, so that even if the same radiation dose is applied, there is the possibility that there occurs a difference between the initial readout value and the final readout value.

Also because of this, as the phosphate-type phosphor having Formula (I) or (II) for use in the method of the present invention, it is desirable to use one having large energy gap trap which is efficiently stimulated by a higher energy light, i.e., a light whose wavelengths are as short as possible. As described above, the optimum stimulating light's wavelength range of the phosphate-type phosphor of the present invention is in the range of from 500 to 900 nm, so that the phosphor has little fading phenomenon as well as high storability of the radiographic image.

In the method of the present invention, the fluorescence that is radiated from the phosphor layer is desirable to have the spectral distribution thereof in a region of as much short wavelengths as possible for the reason that when stimulating the phosphor layer with a light energy, it is necessary to separate the reflected light of the stimulating light from the fluorescence emitted from the phosphor layer, and the photoelectric converter that receives the fluorescence radiated from the phosphor layer generally becomes more highly sensitive to a short wavelength light energy of not less than 600 nm, and the phosphor used in the method of the present invention satisfies this condition.

Namely, any of the phosphate-type phosphors usable in the present invention emits a light having its peak in the region of not more than 600 nm, and the light is easily separated from a stimulating light and well coincident with the spectral sensitivity of the light receiver so that the light is highly efficiently received, and consequently the sensitivity of the image receiving system can be increased.

Figure 4:
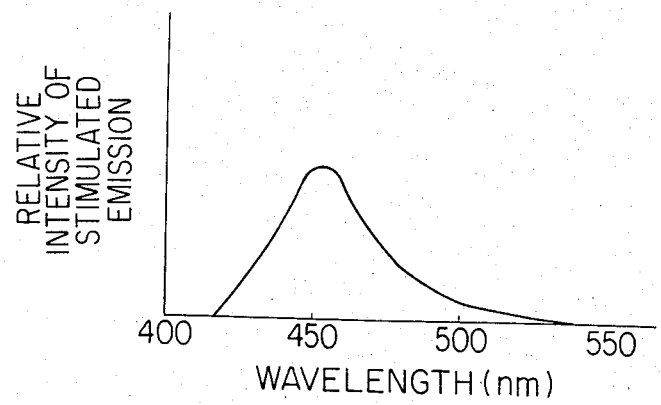
FIG. 4 is a graph showing an stimulated emission spectrum obtained when a $3Sr_3(PO_4)_2 \cdot CaCl_2$: Eu phosphor is stimulated by a He-Ne laser after irradiated by an X-ray.

FIG. 4 shows an example of the spectrum distribution of the light emitted from the $3Sr_3(PO_4)_2 \cdot CaCl_2$:Eu phosphor when stimulated by He-Ne laser light after the phosphor is irradiated by X-rays of an equivoltage of 80 KVp.

The following Table 1 shows the comparison between the sensitivities obtained by the method of the present invention and the sensitivities obtained by the method of the prior art using the SrS:Eu,Sm phosphor, $BaO \cdot SiO_2$:Ce phosphor and LaOCl:Ce,Tb phosphor.

In the table, the sensitivity is expressed in terms of the luminous intensity in the case where the radiographic image conversion panel is irradiated by X-rays having a tube voltage of 80 KVp, and then stimulated by He-Ne laser light, and the fluorescence radiated from the phosphor layer is received by a light receiver (a photoelectric multiplier having a spectral sensitivity of S-5). In the table, the obtained sensitivities are shown with relative values when the sensitivity of the SrS:Eu,Sm phosphor is regarded as 1.

TABLE 1

| No. | Phosphor used in radiographic image conversion panel | Relative sensitivity |
|---|---|---|
| 1 | SrS: Eu, Sm | 1 |
| 2 | $BaO \cdot SiO_2$: Ce($10^{-4}$) | 250 |
| 3 | LaOCl: Ce($10^{-4}$), Tb($10^{-4}$) | 300 |
| 4 | $3Sr_3(PO_4)_2 \cdot CaCl_2$: Eu | 3000 |
| 5 | $3Ca_3(PO_4)_2 \cdot CaCl_2$: Tb | 2000 |
| 6 | $3Sr_3(PO_4)_2 \cdot CaCl_2$: Ce | 1500 |
| 7 | $Ca_3(PO_4)_2$: Ce | 2000 |
| 8 | $3Sr_3(PO_4)_2 \cdot Ca(F, Cl)_2$: Eu | 3000 |
| 9 | $3Ba_3(PO_4)_2 \cdot BaFBr$: $Eu^{2+}$ | 3000 |
| 10 | $Ba_3(PO_4)_2 \cdot 2BaFBr$: $Eu^{2+}$ | 3000 |
| 11 | $Ba_3(PO_4)_2 \cdot BaFBr$: $Eu^{2+}$ | 3000 |
| 12 | $2Ba_3(PO_4)_2 \cdot BaFBr$: $Eu^{2+}$ | 3000 |
| 13 | $3Ba_3(PO_4)_2 \cdot BaFCl$: $Eu^{2+}$ | 3000 |
| 14 | $3Ba_3(PO_4)_2 \cdot BaFI$: $Eu^{2+}$ | 3000 |
| 15 | $3Mg_3(PO_4)_2 \cdot MgFBr$: $Eu^{2+}$ | 3000 |
| 16 | $3Ca_3(PO_4)_2 \cdot CaFBr$: $Eu^{2+}$ | 3000 |

As apparent from Table 1, the method for the conversion of radiographic images in the present invention (No.4–No.16) has remarkably higher sensitivities than does the method of the prior art (No.1–No.3).

Figure 5:
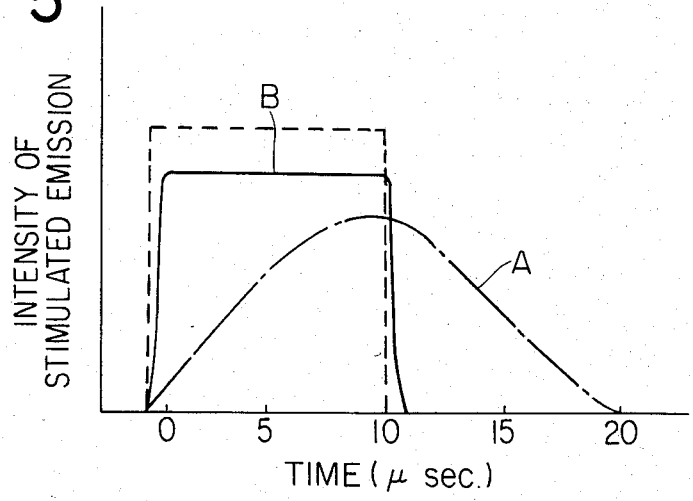
FIG. 5 is a graph showing the response speeds to the stimulation respectively applied in the radiographic image conversion methods, and in which the method of the invention (B) is compared with the conventional method (A).

FIG. 5 is a drawing relating to the response speed of the method of the present invention. The figure shows the comparison between the response speed of the method of the present invention at the time of the irradiation by Ne-He laser light whose intensity changes in the form of a rectangular wave as shown with the broken line in the figure and the response speed of the method of the prior art which uses BaFCl:Eu phosphor.

As apparent from FIG. 5, the response speed of the method of the present invention (B) is significantly higher than that of the method of the prior art (A), so that the method of the present invention enables to largely increase the readout speed of radiographic images.

As has been described in detail, the method for converting radiographic images in the present invention is a method so improved as to have a remarkably high sensitivity and high readout speed.

What we claim:

1. A method for converting radiographic images comprising steps of
    (1) making a radiation passed through an object absorbed into a stimulable phosphor, (2) stimulating the phosphor by a stimulating ray to release a radiation energy stored in the phospher as fluorescence, and (3) detecting the fluorescence to form an image, wherein the phosphor is a phosphate-type phosphor of Formula (I) or (II) and the stimulating ray is at least one of a visible ray of not less than 500 nm and a infrared ray.

Formula (I)

$xM_3(PO_4)_2 \cdot NX_2:yA$

Formula (II)

$M_3(PO_4)_2:yA$ wherein M and N selected from at least one of Mg, Ca, Sr, Ba, Zn and Cd; X is at least one of F, Cl, Br and I; A is at least one of Eu, Tb, Ce, Tm, Dy, Pr, Ho, Nd, Yb, Er, Sb, Tl, Mn and Sn; and x and y are values satisfying the conditions of $0 < x \leq 6$ and $0 \leq y \leq 1$, respectively.

2. The method for converting radiographic images according to claim 1 wherein the stimulating ray's wavelength is not more than 1100 nm.

3. The method for converting radiographic images according to claim 1 wherein an activator's content of the phosphor is from 0 to 1 gram atom to a unit quantity of a phosphor's host-lattice.

4. The method for converting radiographic images according to claim 3 wherein the activator's content is from $10^{-6}$ to 0.6 gram atom to the unit quantity of the phosphor's host-lattice.

5. The method for converting radiographic images according to claim 2 wherein the stimulating ray is a laser light.

6. The method for converting radiographic images according to claim 3 wherein the stimulating ray is a laser light.

7. The method for converting radiographic images according to claim 2 wherein the stimulating ray's wavelength is not more than 900 nm.

8. The method for converting radiographic images according to claim 3 wherein the stimulating ray's wavelength is not more than 900 nm.

9. The method for converting radiographic images according to claim 5 wherein the stimulating ray's wavelength is not more than 900 nm.

10. The method for converting radiographic images according to claim 6, wherein the stimulating ray's wavelength is not more than 900 nm.

11. The method for converting radiographic images according to claim 2, wherein an activator's content of the phosphor is from 0 to 1 gram atom to a unit quantity of a phosphor's host-lattice.

12. The method for converting radiographic images according to claim 11, wherein the activator's content is from $10^{-6}$ to 0.6 gram atom to the unit quantity of the phosphor's host-lattice.

13. The method for converting radiographic images according to claim 11, wherein the stimulating ray is a laser light.

14. The method for converting radiographic images according to claim 13, wherein the stimulating ray's wavelength is not more thanb 900 nm.

15. The method for converting radiographic images according to claim 13, wherein the stimulating ray's wavelength is not more than 900 nm.

* * * * *